Patented Dec. 9, 1941

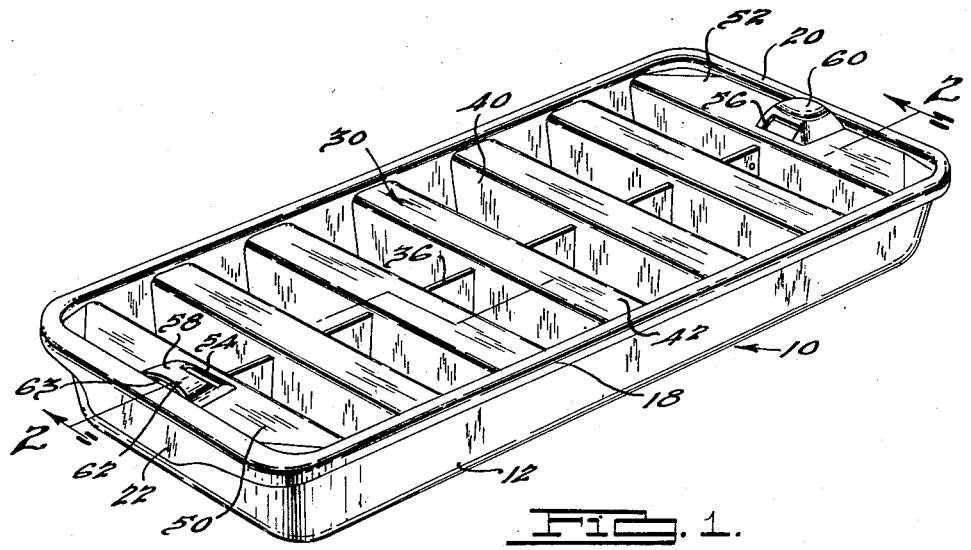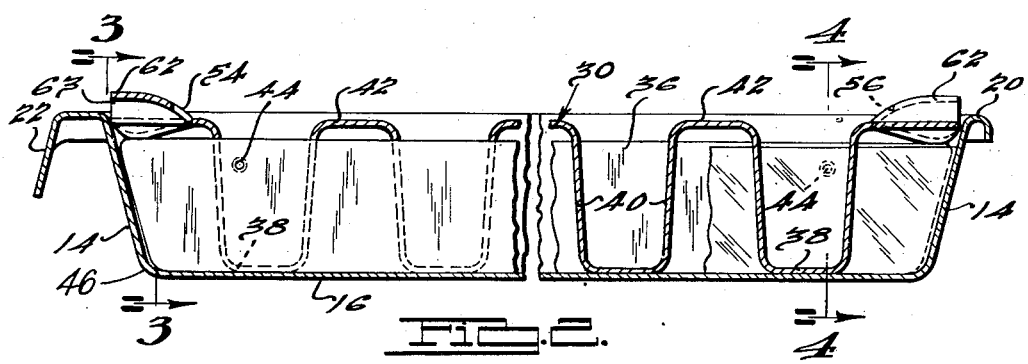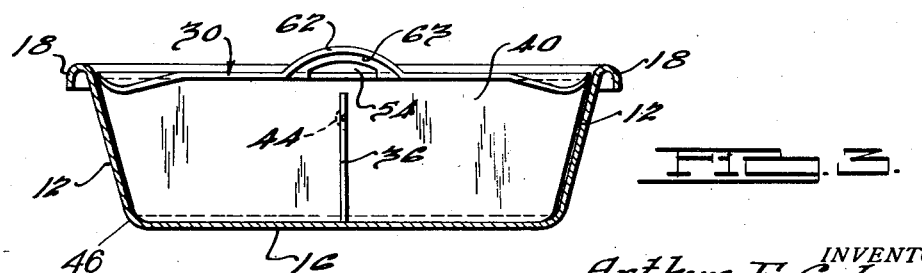

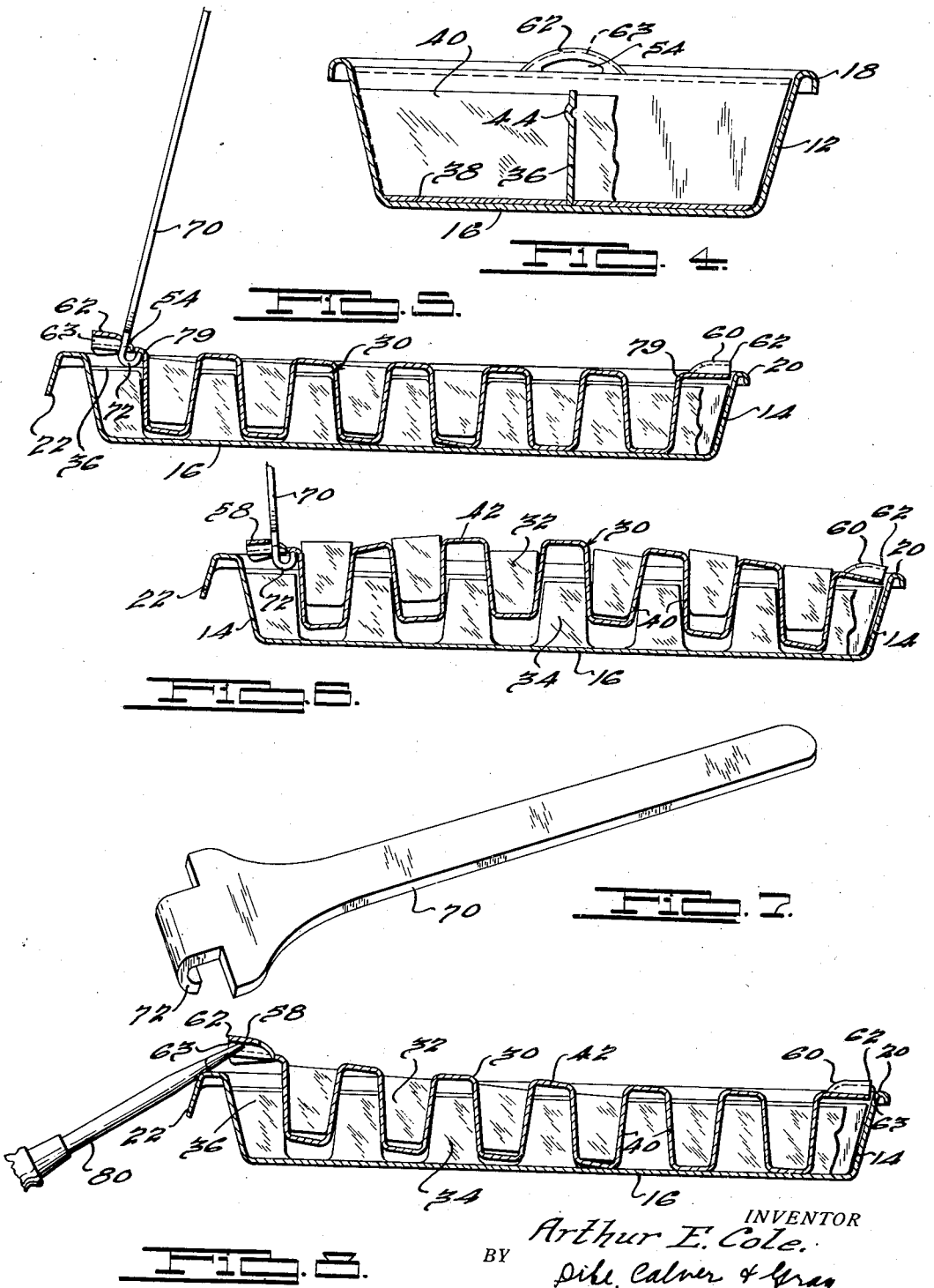

2,265,349

UNITED STATES PATENT OFFICE 2,265,349

ICE TRAY AND GRID

Arthur E. Cole, Detroit, Mich.

Application March 16, 1939, Serial No. 262,120

4 Claims (Cl. 62—108.5)

This invention relates to refrigerators or ice forming machines, and more particularly to ice trays having removable and replaceable grids designed to facilitate the production and removal of individual ice blocks from the machine and tray.

Heretofore ice trays have been formed with removable grids. However, considerable difficulty has been experienced in effecting removal of the grid and the frozen contents from the pan, particularly because of the fact that as the liquid contents of the tray solidifies thereby forming ice, it expands and forces the ice into firm contact with the surfaces of the grid and pan. It has been common practice to heat the surface of the pan, grid and ice as by the application of hot water to melt a portion of the ice, whereupon the bond between the frozen contents of the pan and grid would be broken so that the ice might be removed. This practice is objectionable as it is time consuming and wasteful of ice or other frozen contents of the pan and grid. Efforts have also been made to effect the removal of the frozen substance by mechanical means as by cam or lever mechanisms operable on the tray and grid. This expedient has been undesirable because of the complexity and cost of the actuating mechanism, and also because of the fact that such mechanism could not be quickly and easily actuated to effect removal of the frozen contents from the pan and grid.

An object of this invention is therefore to provide a simple and inexpensive ice tray unit including a grid which may be easily actuated to effect removal of the frozen contents therefrom.

A further object of the invention is to provide a flexible grid member proportioned in such a manner as to utilize the space within the pan to the greatest advantages and to facilitate the removal of the frozen contents therefrom.

Another object resides in the provision of a novel longitudinally flexible grid member adapted to receive manually operable means to flex the grid to facilitate the removal of the frozen contents from the grid and pan of the tray assembly.

A still further object is to provide a novel ice tray assembly including a flexible grid member shaped to receive manually operable means to flex the grid member to permit the removal of any desired quantity of ice.

Other objects and advantages of this invention will be apparent from the following description and claims considered in connection with the accompanying drawings, submitted for purposes of illustration only, and not intended to define the scope of the invention, reference being had for that purpose to the subjoined claims.

In the drawings, wherein similar reference characters refer to similar parts throughout the several views:

Fig. 1 is a perspective view of a device embodying the present invention;

Fig. 2 is a sectional view taken substantially on the line 2—2 of Fig. 1;

Fig. 3 is a sectional view taken substantially on the line 3—3 of Fig. 2;

Fig. 4 is a sectional view taken substantially on the line 4—4 of Fig. 2;

Fig. 5 is a sectional view of one desirable form of the invention with a manually operable grid actuating means in position to flex the grid;

Fig. 6 is a view similar to Fig. 5 showing the grid in flexed position to remove the ice blocks from the grid and pan;

Fig. 7 is a perspective view of the grid flexing means disclosed in Figs. 5 and 6; and Fig. 8 is a sectional view similar to Figs. 5 and 6 disclosing a modified form of grid flexing device to remove the grid and ice blocks from the pan.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to the drawings, which illustrate by way of example, one desirable form of the invention, a tray or pan is designated as a whole by the reference numeral 10. The pan 10 having side and end walls 12 and 14 respectively and a bottom wall 16 is preferably generally rectangular in shape, and may be formed in any desired manner as by a stamping operation wherein suitable draw dies are utilized. The side and end walls 12 and 14 are tapered or inclined upwardly and outwardly with reference to the bottom wall 16, and are connected thereto by a curved section 46, to permit removal of the forming dies, and also to facilitate the removal of the frozen contents such as ice blocks from the pan 10 when in use.

The upper edges of the side and end walls 12 and 14 respectively of the pan 10 are preferably flanged outwardly and downwardly as illustrated at 18 and 20 respectively to stiffen the pan against transverse bending, and also to present rounded surfaces thereby minimizing the possibility of injuring the hands of persons manipulating the tray. One end of the pan may be formed with an extended flange 22 by which the tray may be grasped to remove it from a freezing compartment of a refrigerator or ice forming machine.

A grid 30 formed of flexible metal or other suitable material may be placed in the pan 10 to divide the space within the pan into a plurality of ice block spaces of suitable size. The grid 30 is preferably formed of a single piece of metal deformed in any suitable manner as by a stamping operation to form a plurality of oppositely directed spaces of generally rectangular or trapezoidal shape, such for example as the upwardly directed spaces 32 and the downwardly directed spaces 34.

The ice block spaces 32 and 34 formed by the grid 30 within the pan 10 may be divided laterally of the pan to form ice blocks of suitable length by separator means 36 extending longitudinally through the grid member 30 within the pan 10. Any desired number of separator means 36 extending longitudinally of the pan through the grid 30 may be provided within the pan 10. The grid member 30 may be slotted vertically to receive the separator 36, the slots extending through the walls 38 and 40 forming bottom and partitioning walls of the upwardly directed spaces 32 and extending to the upper walls 42 of the portions of the grid defining the top of the downwardly directed spaces 34.

The lower edge of the separator 36 engages the bottom of the pan 10, and in addition to separating the ice blocks transversely of the pan and grid, also serves as a heat transfer medium to insure more rapid freezing of the liquid contents of the pan and grid. The separator 36 may be held in assembled relation relative to the grid 30 by means of a plurality of indentations 44 formed therein. The indentations 44 are of sufficient depth to prevent the separator 36 from escaping from the slots formed in the grid 30, and are so spaced as illustrated in Figs. 3 and 4 to prevent undesirable longitudinal movement relative to the grid.

The edges of the partitioning walls 40 of the grid 30 which lie adjacent the side walls 12 of the pan 10 are tapered or inclined angularly relative to the lower and upper walls 38 and 42 to lie adjacent the side walls 12 of the pan when the grid 30 is in position in the pan. The lower edges of the partitioning walls 40 and the lower walls 38 of the grid 30 are also rounded or cut away so as to conform to the rounding of the section 46 interconnecting the side walls 12 with the bottom 16 of the pan.

The pan grid and separator may of course be formed of any desired metal, however it has been found that excellent results are obtained when they are formed of aluminum and are anodically treated and sealed by applying a substance having greasy or oily properties such for example as paraffin or wax to their surface. During the sealing operation the sealing medium such as paraffin or wax is drawn into the anodically treated surface of the grid, tray and separator by capillary attraction and thereafter presents a very smooth surface which prevents the liquid from seeping thereinto during the freezing operation. The ice or other frozen contents of the pan and grid may be readily removed therefrom by a slight flexing of the grid 30.

Manually operable means may be employed if desired to flex the grid 30 to effect removal of the ice or other frozen contents from the grid and pan, or one end of the grid may be lifted manually to accomplish the same result.

The opposite generally horizontally extending flanged sections 50 and 52 of the grid 30 may be apertured as illustrated at 54 and 56 respectively. The metal of the grid beyond the apertures 54 and 56 may be formed upwardly thereby forming embossed portions as illustrated at 58 and 60 respectively to strengthen this section of the flange and also to provide an outwardly extending lip 62 projecting above the level of the end walls 14 of the pan and flanges 20 and 22, thereby forming apertures 63 adapted to receive an instrument by means of which the grid may be flexed. If desired the flanged sections 50 and 52 may also be reinforced by impressing rigidifying grooves therein. The rigidifying grooves may be extended down the adjacent side walls 40. If deemed advisable reinforcing pieces may also be applied in any suitable manner as by spot welding to the upper or lower surface of the flanged sections 50 and 52. These reinforcing pieces may be extended down the adjacent side walls 40 if desired.

The operation of this device is as follows: The grid 30 and separator 36 are placed in the tray 10, and water or other substance to be frozen is poured in the tray filling the upwardly and downwardly directed spaces 32 and 34. The tray is then placed in the freezing compartment of a refrigerator or ice forming device and allowed to remain a sufficient period of time to freeze the contents of the tray. When it is desired to extract the frozen contents from the tray, the flange 22 which forms a handle is grasped and the tray lifted out of the freezing compartment. The bond between the bottom of the tray 10 and the freezing compartment may easily be broken because of the fact that the sealed surface of the bottom of the tray repels moisture to such an extent that no material bond is produced between the tray and the supporting surface of the compartment. If desired the bottom of the tray may be flanged downwardly, or a plurality of indentations may be formed in the bottom to provide line or point contact with the supporting surface of the freezing compartment. After the tray is removed from the freezing compartment, it may be set on any suitable surface.

A grid actuating lever 70 having a hook portion 72 adapted to project through the apertures 54 and 56 in the flanged sections 50 and 52, may be employed to flex the grid to release the ice blocks from the grid and tray. The hook portion 72 of the lever 70 may be inserted in one of the apertures 54 and 56 as illustrated in Fig. 5. The lever 70 may then be rotated outwardly from the pan to flex the grid as illustrated in Fig. 6. The ice blocks in the upwardly directed spaces 32 may then be picked out for use without interfering with those in the downwardly directed spaces 34. If all of the ice in the tray is desired for use at one time, the grid 30 may be removed, leaving the ice blocks below the grid in the pan.

During the flexing operation of the grid 30, it will be observed that the hook portion 72 of the lever 70 exerts a bending force on one of the flanged sections 50 or 52 of the grid 30, bending downward the ends thereof and bending or bowing upwardly the midportion of the grid, thereby breaking the contact between the pan and the ice blocks. This contact is of course easily broken because of the fact that all of the ice contacting surfaces are sealed as pointed out above. It will be noted that in accomplishing the foregoing the shank of the lever 70 adjacent the hook 72 engages the rear edge of the slot 54 or 56 while the end of the hook engages flange 62 or 60 at a point spaced inwardly relatively to the pan, preferably at a point at or adjacent the bend 79. At the time the contact between the ice blocks, grid and the pan breaks due to the flexing of the grid, the contact between the ice or other frozen contents and the grid is also broken. As the grid moves from the position illustrated in Fig. 5, the bottom of the hooked section 72 of the lever 70 engages the upper edge of the separator 36 to assist in elevating the grid to break the bond between the ice blocks and the grid and pan, and also to aid in supporting the end 50 or 52 of the grid. The lever 70 may of course be used at either end of the grid. In some instances it may be desirable to hold the non-actuated end of the grid downward, and in some cases it might be found desirable to use the grid flexing lever successively at both ends of the grid.

This type of grid may of course be actuated in other ways such for example as by means of a finger or by utilizing the end of any instrument such as an ice pick or screwdriver 80 projected into the aperture 63 between the outwardly extending lip 62 and the top of the flanged upper portion of the ends of the tray 20 or 22 to lift one end of the grid 30 in the tray as illustrated in Fig. 8 to break the contact between the ice blocks and the pan and grid. Both ends of the grid may be actuated in this manner if desired.

I claim:

1. In an ice tray for refrigerators, a pan having upright end and side walls defining an ice freezing compartment, a flexible removable grid member adapted to be positioned in said pan and having partitioning walls forming alternate upwardly and downwardly opening ice block spaces, said grid having a generally horizontal end flange terminating substantially within the margin of the end of the pan, said end flange being provided with an upwardly projecting portion providing an aperture defined by vertically spaced edge portions for the reception of a detached implement, and a separator member extending through the partitioning walls of said grid and terminating adjacent the end of the pan below said end flange, said grid being adapted to be flexed as a unit relatively to said separator member.

2. An ice tray comprising a pan having a bottom and upwardly and outwardly inclined side and end walls, the pan having inwardly curved corners at the junctures of the side and end walls with the bottom, a flexible metal grid formed to provide generally trapezoidal ice block spaces alternately opening upwardly and downwardly, an apertured upwardly flanged portion of the grid positioned to lie within the margin of the end walls of the pan and in a plane above the end walls of the pan, the upright edges of the grid being inclined substantially in accordance with the inclination of the side walls of the pan and the bottom side edges of the grid being offet inwardly to clear the curved corners of the pan, and separator means projecting longitudinally through the grid and supported by the bottom of the pan to divide the ice block spaces formed by the grid.

3. An ice tray comprising a pan having a bottom and upwardly and outwardly inclined side walls, the pan having inwardly curved corners at the junctures of the side walls and bottom, a flexible metal grid formed to provide generally rectangular ice block spaces alternately opening upwardly and downwardly, the upright edges of the grid being inclined substantially in accordance with the inclination of the side walls of the pan and the bottom side edges of the grid being offset inwardly to clear the curved corners of the pan, separator means projecting longitudinally through the grid and supported by the bottom of the pan to divide the ice block spaces formed by the grid, and detached manually operable means adapted to engage the grid within the margin of the end walls of the pan to flex the grid while in the tray to release the ice blocks.

4. A grid for use in an ice pan comprising a flexible metal grid formed to provide a plurality of generally rectangular shaped ice block spaces alternately opening upwardly and downwardly, an apertured upwardly flanged portion of the grid positioned to lie within the marginal confines of the end walls of the pan and in a plane above the end walls of the pan, the side walls of the grid being inclined upwardly and outwardly from the bottom and having rounded corners at the juncture between the bottom of the grid and said side walls, the grid being slotted below the upper walls to receive generally vertically disposed separator means, means to prevent separation of the separator means and grid, and detached manually operable lever means adapted to engage in said apertured upwardly flanged portion to flex the grid.

ARTHUR E. COLE.